US009554255B2

(12) United States Patent
Mogalapalli

(10) Patent No.: US 9,554,255 B2
(45) Date of Patent: Jan. 24, 2017

(54) SYSTEM AND METHOD FOR PROVIDING USSD SERVICES USING CROSS-OPERATOR NUMBER

(71) Applicant: OnMobile Global Limited, Bangalore, Karnataka (IN)

(72) Inventor: Srinivas Nagendra Mogalapalli, Bangalore (IN)

(73) Assignee: OnMobile Global Limited, Bangalore (IN)

( * ) Notice: Subject to any disclaimer, the term of this patent is extended or adjusted under 35 U.S.C. 154(b) by 0 days.

(21) Appl. No.: 14/242,986

(22) Filed: Apr. 2, 2014

(65) Prior Publication Data

US 2014/0302825 A1 Oct. 9, 2014

(30) Foreign Application Priority Data

Apr. 3, 2013 (IN) .......................... 1515/CHE/2013

(51) Int. Cl.
*H04W 4/14* (2009.01)
(52) U.S. Cl.
CPC ..................... *H04W 4/14* (2013.01)
(58) Field of Classification Search
CPC ....................................... H04W 4/14
USPC ......................................................... 455/466
See application file for complete search history.

(56) References Cited

U.S. PATENT DOCUMENTS

| 6,330,445 | B1 * | 12/2001 | Skog et al. .................... 455/433 |
| 7,747,264 | B2 * | 6/2010 | Fiorini ........................... 455/466 |
| 8,548,908 | B2 * | 10/2013 | Friedman ....................... 705/41 |
| 2003/0139174 | A1 * | 7/2003 | Rao ............................... 455/418 |
| 2004/0165569 | A1 | 8/2004 | Sweatman et al. |
| 2005/0260993 | A1 * | 11/2005 | Lovell, Jr. ..................... 455/445 |
| 2008/0200155 | A1 * | 8/2008 | Hasemann ................. 455/414.3 |
| 2008/0233984 | A1 | 9/2008 | Franklin |
| 2009/0042539 | A1 * | 2/2009 | Jiang et al. ................... 455/408 |
| 2009/0275307 | A1 * | 11/2009 | Kahn ........................ 455/404.1 |
| 2010/0048228 | A1 * | 2/2010 | Harju et al. .................. 455/466 |
| 2011/0015987 | A1 * | 1/2011 | Chakraborty et al. ..... 705/14.39 |
| 2011/0070871 | A1 | 3/2011 | Kahn |
| 2011/0151845 | A1 * | 6/2011 | Staykoff ..................... 455/414.1 |
| 2012/0058753 | A1 * | 3/2012 | Kulakowski ........ H04W 76/027 455/415 |
| 2012/0264462 | A1 * | 10/2012 | Shen et al. .................... 455/466 |

* cited by examiner

*Primary Examiner* — Nathan Mitchell
(74) *Attorney, Agent, or Firm* — Hoffmann & Baron, LLP

(57) ABSTRACT

A computer-implemented method and system for providing Unstructured Supplementary Service Data (USSD) services is provided. The computer-implemented method comprises the steps of configuring a cross-operator USSD module for receiving one or more service requests sent to a cross-operator number by one or more communication devices associated with one or more telecommunication service providers. The cross-operator USSD module further processes the one or more service requests for generating one or more interactive USSD menus based on information retrieved from the one or more service requests and one or more pre-defined rules. Furthermore, the cross-operator USSD module renders the one or more interactive USSD menus on the one or more communication devices, wherein the one or more interactive USSD menus facilitate one or more users of the one or more communication devices to avail the USSD services.

25 Claims, 12 Drawing Sheets

SYSTEM AND METHOD FOR PROVIDING USSD SERVICES USING CROSS-OPERATOR NUMBER

FIELD OF THE INVENTION

The present invention relates generally to Unstructured Supplementary Service Data (USSD). More particularly, the present invention provides a system and method for providing USSD services using a cross-operator number.

BACKGROUND OF THE INVENTION

In telecommunications industry, short codes and long codes are widely used for the purpose of marketing, advertising, promotions, delivering and activating services and providing Value Added Services (VAS) by Telecommunication Service Providers (TSPs) and third parties such as VAS providers, advertising firms, media companies and business houses. Short codes and long codes are phone numbers provided by the TSPs/operators to the third parties and business houses for receiving Short Messaging Service (SMS) messages and voice calls. Long codes are standard ten or eleven digits phone numbers provided by the TSPs/operators both for commercial and personal usage. The short codes are special phone numbers usually having four to five digits that are provided by the TSPs/operators at a higher price for commercial/business purposes. The short codes may also have additional extensions to the standard four or five digits. For example, "5XXXX", a short code, may have an extension such as 11 to form an extended short code such as "5XXXX11". Both short codes and long codes are used by customers to avail services such as mobile services, setting ring-back tones, ordering ringtones, television programs voting, seeking additional information and other VAS services by sending SMS messages and calling on the short codes and the long codes.

Conventionally, TSPs provide short codes and long codes to the third parties and business houses that require the users to interact via SMS messages for availing services. However, most of the users drop out from the SMS interaction after first few SMS messages. Further, interaction via SMS messages and voice calls on short codes and long codes used by third parties is chargeable at premium rates rather than the standard SMS and voice call rates thereby reducing the number of users availing services associated with long codes and short codes. This results in loss of revenue for the third parties and businesses who have acquired the long codes and the short codes from TSPs for promotional and marketing purposes.

To overcome the above-mentioned disadvantages, communication via Unstructured Supplementary Service Data (USSD) channel is a viable solution. The USSD channel provides a simple menu using a real-time and session based connection. The connection allows a two-way exchange of data thereby making it interactive and easy to use as the user is required to key-in few characters to send a response via USSD. Moreover, communication via USSD is usually not chargeable and only the services availed/activated via USSD are chargeable to the users. However, TSPs do not provide USSD codes to the third parties and business houses to facilitate communication with the users via USSD. Further, even if the third parties and business houses are able to procure a USSD code from a particular TSP, it is very difficult and sometimes impossible to procure the same USSD code from other TSPs. The third parties and business houses therefore cannot avail a common USSD code for marketing and promotional purposes that can be used by the users belonging to different TSPs/operators.

In light of the above, there is a need for a system and method for providing USSD services using a cross-operator number. Further, there is a need for a system and method that can initiate the USSD services based on one or more service requests received in the form of SMS messages and voice calls via one or more telecommunication channels. Furthermore, there is a need for system and method that can provide customized USSD menus to one or more users irrespective of the TSP/operator providing telecommunication services. In addition, there is a need for a system and method that can integrate with the existing USSD services.

SUMMARY OF THE INVENTION

A computer-implemented method and system for providing Unstructured Supplementary Service Data (USSD) services is provided. The computer-implemented method comprises the steps of configuring a cross-operator USSD module for receiving one or more service requests sent to a cross-operator number by one or more communication devices associated with one or more telecommunication service providers. The cross-operator USSD module further processes the one or more service requests for generating one or more interactive USSD menus based on information retrieved from the one or more service requests and one or more pre-defined rules. Furthermore, the cross-operator USSD module renders the one or more interactive USSD menus on the one or more communication devices, wherein the one or more interactive USSD menus facilitate one or more users of the one or more communication devices to avail the USSD services.

In an embodiment of the present invention, configuring the cross-operator USSD module further comprises the step of extracting one or more attributes corresponding to the received one or more service requests. Further, configuring the cross-operator USSD module comprises the step of retrieving information related to the one or more users based on at least one of: the one or more extracted attributes and the USSD services associated with the cross-operator number. In addition, configuring the cross-operator USSD module comprises the step of generating and customizing the one or more USSD menus using at least one of: the one or more extracted attributes, the retrieved information and the one or more pre-defined rules. In an embodiment of the present invention, the one or more attributes corresponding to the received one or more service requests comprise at least one of: Mobile Subscriber Integrated Services Digital Network (MSISDN) number, content of SMS message and any other unique number associated with the one or more communication devices. In an embodiment of the present invention, retrieving the information related to the one or more users comprises identifying profiles of the one or more users using the one or more extracted attributes. Further, retrieving the information related to the one or more users comprises analyzing the profiles for determining and retrieving information comprising at least one of: preferences, interests, behaviors, usage and purchase patterns of the one or more users. Furthermore, retrieving the information related to the one or more users comprises generating the one or more customized interactive USSD menus using the retrieved information. In an embodiment of the present invention, the cross-operator number is generated by the cross-operator module and the one or more telecommunication service providers for availing the USSD services.

In an embodiment of the present invention, the computer-implemented method further comprises configuring a Mobile Switching Center (MSC) server for receiving the one or more service requests sent from the one or more communication devices to the cross-operator number. Furthermore, the computer-implemented method comprises configuring the MSC server for ascertaining if the cross-operator number is associated with the USSD services. In addition, the computer-implemented method comprises configuring MSC server for routing the received one or more service requests to the cross-operator USSD module if it is ascertained that the cross-operator number is associated with the USSD services. Also, the computer-implemented method comprises configuring MSC server for routing the received one or more service requests to at least one of: a Short Message Service Center (SMSC) and a telephony service module if it is ascertained that the cross-operator number is not associated with the USSD services.

In an embodiment of the present invention, the SMSC is configured to receive the one or more service requests from the MSC server and further interaction is performed via SMS. In an embodiment of the present invention, the telephony service module is configured to receive the one or more service requests from the MSC server and further interaction is performed via voice calls.

In an embodiment of the present invention, the cross-operator number includes and is not limited to a long-code, a short-code, and a common short-code. In an embodiment of the present invention, the one or more service requests are telecommunication service requests comprising at least one of: sending a Short Message Service (SMS), sending a Multimedia Messaging Service (MMS), initiating a General Packet Radio Service (GPRS) connection, placing a voice call, placing a missed call and placing a data call. In an embodiment of the present invention, the USSD service associated with the cross-operator number comprise at least one of: Wireless Application Protocol (WAP) browsing service, prepaid callback service, account balance/billing details service, mobile-money service, location-based content service, menu-based information service, value-added service and device configuration service.

In an embodiment of the present invention, the one or more pre-defined rules comprise at least one of: rules related to number of options, categories of options, repetition of options, validity of options and default options to be provided in a USSD menu.

The system for providing USSD (Unstructured Supplementary Service Data) services comprises one or more communication devices associated with one or more telecommunication service providers for sending one or more service requests to a cross-operator number. The system further comprises a cross-operator USSD module configured to receive the one or more service requests. The cross-operator module is further configured to process the one or more service requests for generating one or more interactive USSD menus based on information retrieved from the one or more service requests and one or more pre-defined rules. Furthermore, the cross-operator module is configured to render the one or more interactive USSD menus on the one or more communication devices, wherein the one or more interactive USSD menus facilitate one or more users to avail the USSD services.

In an embodiment of the present invention, the cross-operator USSD module is configured to communicate with one or more operator networks for providing USSD services to the one or more users.

In an embodiment of the present invention, the cross-operator USSD module comprises an incoming message processor configured to extract one or more attributes corresponding to the received one or more service requests. The cross-operator module further comprises a business intelligence module configured to retrieve information related to the one or more users using the one or more communication devices based on at least one of: the one or more extracted attributes and the USSD services associated with the cross-operator number. Furthermore, the cross-operator USSD module comprises a rules engine configured to provide the one or more pre-defined rules. In addition, the cross-operator USSD module comprises a menu manager configured to customize the one or more generated USSD menus using at least one of: the one or more extracted attributes, the retrieved information and one or more pre-defined rules.

In an embodiment of the present invention, retrieving the information related to the one or more users using the one or more communication devices comprises identifying profiles of the one or more users using the one or more extracted attributes. Further, retrieving the information related to the one or more users using the one or more communication devices comprises analyzing the profiles for determining and retrieving information comprising at least one of: preferences, interests, behaviors, usage and purchase patterns of the one or more users. Furthermore, retrieving the information related to the one or more users using the one or more communication devices comprises forwarding the retrieved information to the menu manager for generating the one or more customized interactive USSD menus.

In an embodiment of the present invention, the system further comprises a Mobile Switching Center (MSC) server configured to receive the one or more service requests sent from the one or more communication devices to the cross-operator number. The MSC server is further configured to ascertain if the cross-operator number is associated with the USSD services. Furthermore, the MSC server is configured to route the received one or more service requests to the cross-operator USSD module if it is ascertained that the cross-operator number is associated with the USSD services. Also, the MSC server is configured to route the received one or more service requests to at least one of: a Short Message Service Center (SMSC) and a telephony service module if it is ascertained that the cross-operator number is not associated with the USSD services.

A computer program product for providing Unstructured Supplementary Service Data (USSD) services is provided. The computer program product comprises a non-transitory computer-readable medium having computer-readable program code stored thereon, the computer-readable program code comprising instructions that when executed by a processor, cause the processor to receive one or more service requests sent to a cross-operator number by one or more communication devices associated with one or more telecommunication service providers. The processor further processes the one or more service requests for generating one or more interactive USSD menus based on information retrieved from the one or more service requests and one or more pre-defined rules. Furthermore, the processor renders the one or more interactive USSD menus on the one or more communication devices, wherein the one or more interactive USSD menus facilitate one or more users of the one or more communication devices to avail the USSD services.

In an embodiment of the present invention, the computer program product further comprises extracting one or more attributes corresponding to the received one or more service requests. Furthermore, the computer program product comprises retrieving information related to the one or more users based on at least one of: the one or more extracted attributes and the USSD services associated with the cross-operator number. In addition, the computer program product comprises generating and customizing the one or more USSD menus using at least one of: the one or more extracted attributes, the retrieved information and the one or more pre-defined rules.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

A system and method for providing Unstructured Supplementary Service Data (USSD) services using a common cross-operator number is described herein. The invention provides for a system and method that can initiate the USSD services based on one or more service requests received in the form of SMS messages and voice calls. The invention further provides for a system and method that can provide customized USSD menus to one or more users irrespective of the TSP/operator providing telecommunication services. Furthermore, the invention provides for a system and method which integrates with the existing USSD services.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
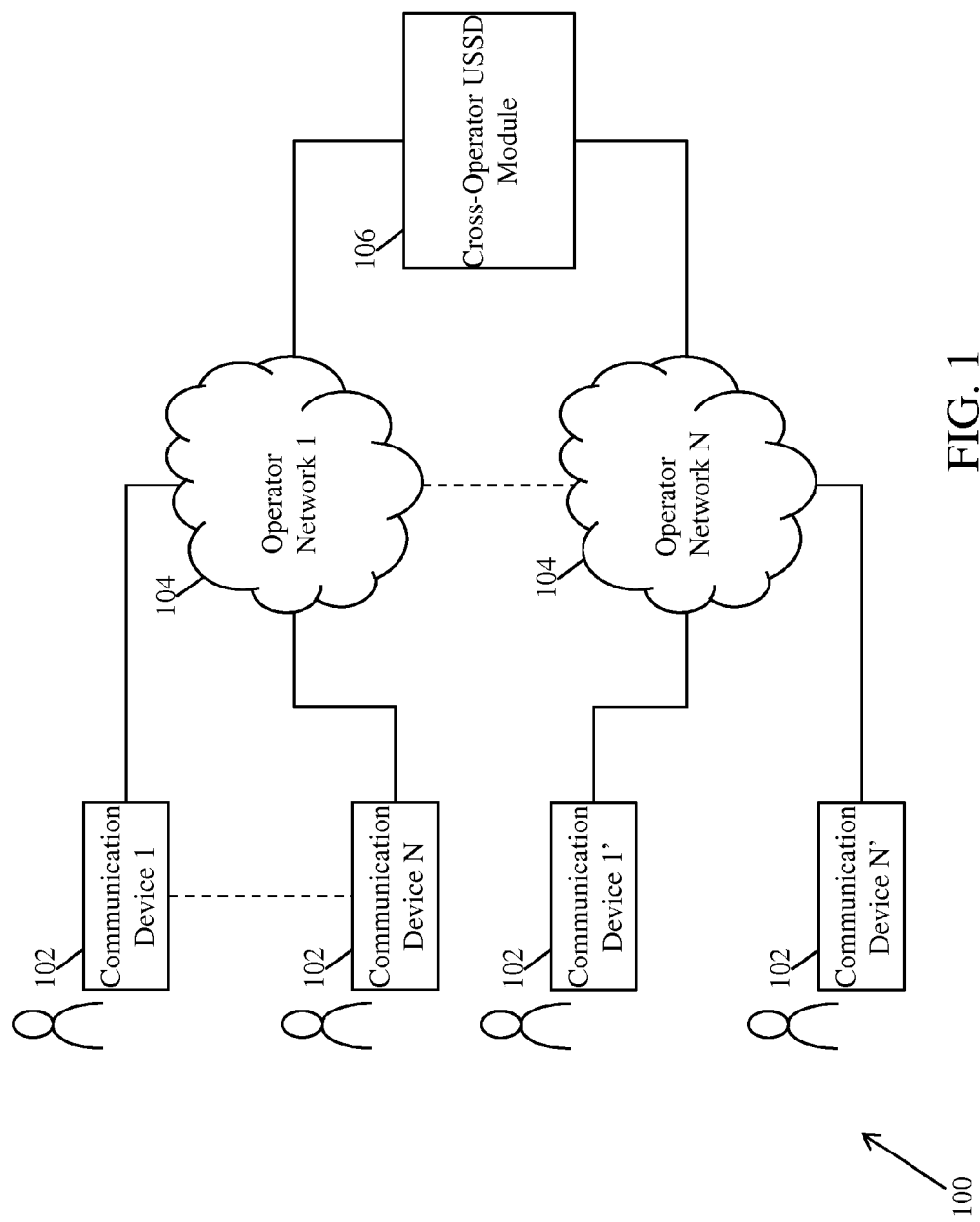
FIG. 1 is a block diagram illustrating a system for providing Unstructured Supplementary Service Data (USSD) services in accordance with an embodiment of the present invention.

FIG. 1 is a block diagram illustrating a system for providing Unstructured Supplementary Service Data (USSD) services in accordance with an embodiment of the present invention. The system 100 comprises one or more communication devices 102, one or more operator networks 104 and a cross operator USSD module 106.

The one or more communication devices 102 are associated with one or more Telecommunication Service Providers (TSPs) and are configured to facilitate the one or more users to send one or more service requests to a cross-operator number via an operator network 104. In an embodiment of the present invention, the one or more communication devices 102 include, but not limited to, a cell phone, a mobile phone, a Personal Digital Assistant (PDA), a smart phone, a device supporting Global System for Mobile (GSM) and any other telecommunication device.

In an embodiment of the present invention, the one or more users are customers availing telecommunication services provided by the one or more TSPs/operators. The one or more TSPs have telecommunication network (also referred as operator network) which comprises hardware and software elements to provide telecommunication services. In an embodiment of the present invention, the one or more service requests include requests to avail telecommunication services such as, but not limited to, Short Message Service (SMS), Multimedia Messaging Service (MMS), General Packet Radio Service (GPRS), voice calls, missed calls and data calls.

In an embodiment of the present invention, the cross-operator number is a common number used by the one or more users belonging to different TSPs/operators to avail USSD services. In an embodiment of the present invention, the cross-operator number is generated by the one or more TSPs and the cross-operator USSD module 106. The USSD services are availed by sending one or more service requests to the cross-operator number. Further, the cross-operator number facilitates in providing one or more interactive USSD menus corresponding to the associated USSD services. The one or more interactive USSD menus are rendered on the one or more communication devices 102 when the one or more users send the one or more service requests to the cross-operator number. In an embodiment of the present invention, the one or more interactive USSD menus are used by the one or more users for availing various USSD services such as, but not limited to, Wireless Application Protocol (WAP) browsing, prepaid callback services, account balance/billing details service, mobile-money services, location-based content services, menu-based information services, value-added services and device configuration services. In various embodiments of the present invention, the cross-operator number includes, but not limited to, a long code, a short code and a common short code.

The one or more operator networks 104 are configured to route the one or more received service requests from the one or more communication devices 102 to the cross-operator USSD module 106. In an embodiment of the present invention, the one or more operator networks 104 comprises a Mobile Switching Center (MSC) server which ascertains if the cross-operator number is associated with the USSD services. In an embodiment of the present invention, if it is ascertained that the cross-operator number is associated with the USSD services then the one or more services requests are routed to the cross-operator USSD module 106. In an embodiment of the present invention, if it is ascertained that the cross-operator number is not associated with the USSD services then other channels of communication are invoked and the service request is forwarded to at least one of: a Short Message Service Center (SMSC) and a telephony service module. The SMSC is configured to receive the one or more service requests in the form of SMS message and continue further communication via SMS. The telephony service module is configured to receive the one or more service requests in the form of voice calls and continue further communication by routing the call to appropriate destination. In an embodiment of the present invention, if the call is not answered by the intended recipient or the call is terminated by the one or more users via the communication device 102 prior to recipient answering the call then the call is considered to be a missed call.

The cross-operator USSD module 106 comprises a cross-operator platform which is configured to receive the one or more service requests from the one or more operator networks 104 if the cross-operator number is associated with the USSD services. Further, the cross-operator USSD module 106 processes the received one or more service requests to generate an interactive USSD menu using information retrieved from the one or more service requests and one or more pre-defined rules. Furthermore, the generated interactive USSD menu is rendered on the one or more communication devices 102 via the operator network 104.

Figure 2:
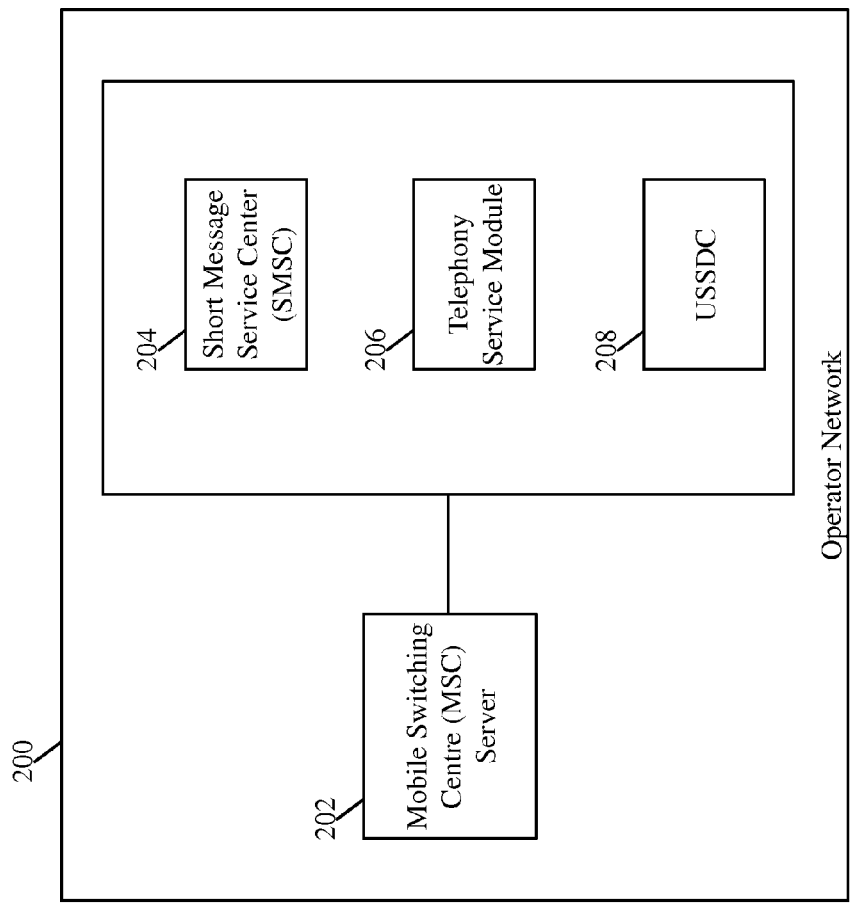
FIG. 2 is a detailed block diagram of an operator network in accordance with an embodiment of the present invention.

FIG. 2 is a detailed block diagram illustrating an operator network in accordance with an embodiment of the present invention. The operator network 200 comprises a Mobile Switching Centre (MSC) Server 202, a Short Message Service Center (SMSC) 204, a telephony service module 206 and an Unstructured Supplementary Service Data Center (USSDC) 208.

The MSC server 202 is configured to receive the one or more service requests sent to the cross-operator number by the one or more users via the one or more communication devices. The MSC server 202 is further configured to route the one or more received service requests to the destination communication device based on the cross-operator number. In an embodiment of the present invention, the MSC server 202 controls and manages the various components of the network switching subsystem (not shown) which is used for providing telecommunication services. The MSC server 202 ascertains if the cross-operator number is associated with the USSD services. In an embodiment of the present invention, if the cross-operator number is associated with the USSD services then the one or more received service requests in the form of SMS messages are forwarded to the cross-operator USSD module 106 (FIG. 1) via the SMSC 204. In another embodiment of the present invention, if the cross-operator number is associated with the USSD services then the one or more received service requests in the form of voice calls are forwarded to the cross-operator USSD module 106 (FIG. 1) via the telephony service module 206.

In an embodiment of the present invention, if it is ascertained that the cross-operator number is not associated with the USSD service, then the one or more service requests are processed and communication is facilitated using other telecommunication services such as, but not limited to, SMS, MMS, GPRS, voice calls and data calls. In an embodiment of the present invention, the MSC server 202 determines if the received service request on the cross-operator number is in the form of SMS message. If the received service request is in the form of the SMS message, then the MSC server 202 forwards the SMS message to the SMSC 204 and further interaction is performed via SMS messages. In an embodiment of the present invention, if the received service request is in the form of a voice call, then the MSC server 202 facilitates routing the call to the cross-operator number via the telephony service module 206 and further interaction is performed via voice calls.

The SMSC 204 is a network element in the operator network 200 configured to store and forward SMS messages received from the one or more users via the MSC server 202 to the cross-operator USSD Module 106 (FIG. 1). Further, the SMSC 204 is also configured to route messages from the MSC server 202 to the one or more communication devices 102 (FIG. 1). The SMSC 204 facilitates monitoring and accurate routing of the one or more SMS messages.

The telephony service module 206 is configured to facilitate monitoring, routing and managing voice calls from and to one or more communication devices via the MSC server 202. The telephony service module 206 is also configured to route the voice calls to the cross-operator USSD Module 106 (FIG. 1) if the cross-operator number is associated with USSD services.

The USSDC 208 is a gateway to integrate with the operator network components to facilitate communication using USSD. The USSDC 208 is configured to initiate and maintain USSD sessions across one or more communication devices 102 (FIG. 1). In an embodiment of the present invention, the USSDC 208 uses Signalling System 7 (SS7) protocol stack supporting Mobile Application Part (MAP) protocol for communication.

Figure 3:
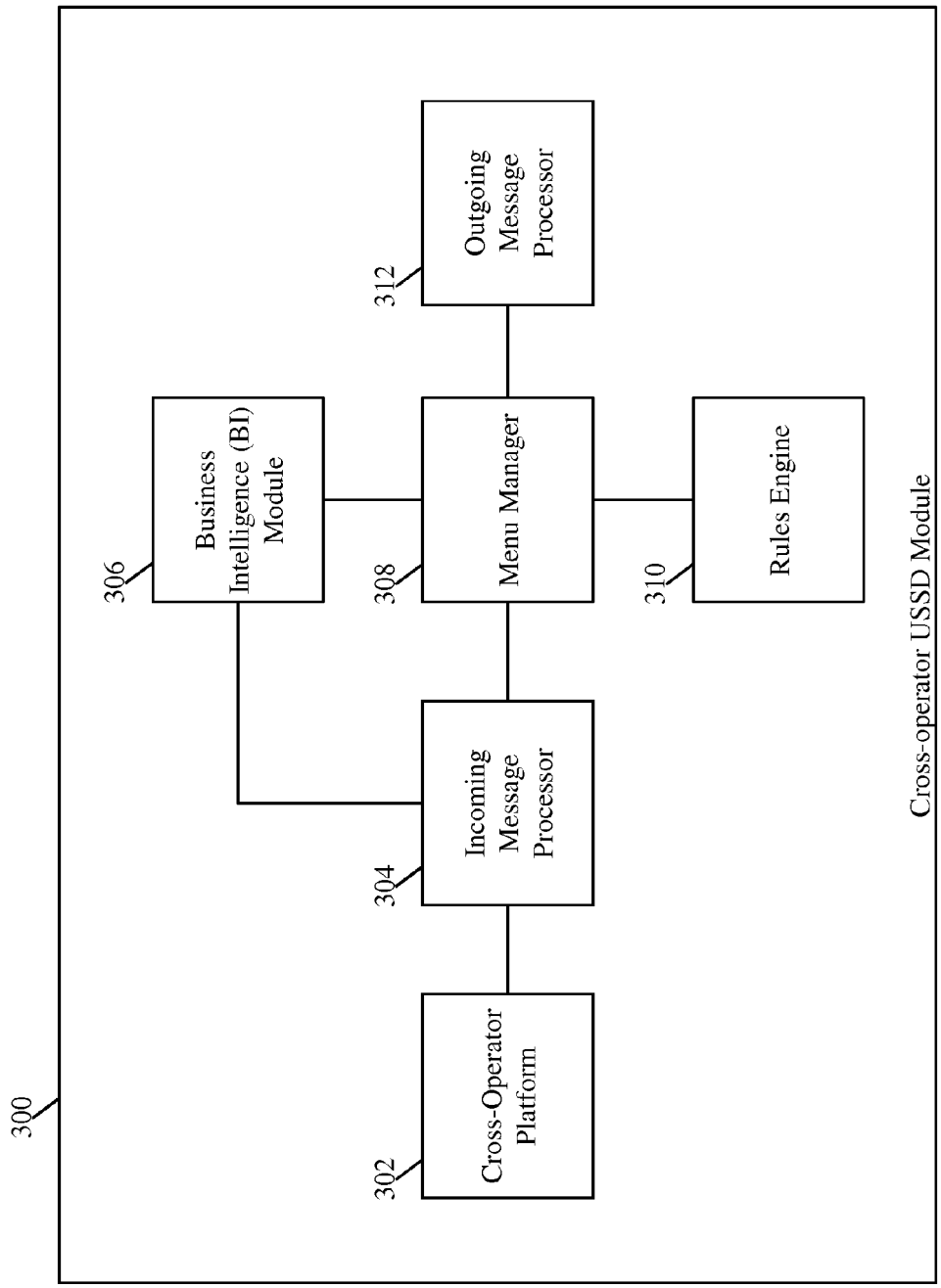
FIG. 3 is a detailed block diagram of a cross-operator USSD module in accordance with an embodiment of the present invention.

FIG. 3 is a detailed block diagram of a cross-operator USSD module in accordance with an embodiment of the present invention. The cross operator USSD module 300 comprises a cross-operator platform 302, an incoming message processor 304, a Business Intelligence (BI) module 306, a menu manager 308, a rules engine 310 and an outgoing message processor 312.

The cross-operator platform 302 is configured to receive the one or more service requests sent to the cross-operator number via one or more operator networks 104 (FIG. 1). In various embodiments of the present invention, the cross-operator platform 302 receives the one or more service requests from the one or more users belonging to different TSPS/operators. The cross operator platform 302 integrates with various components of the one or more operator networks 104 (FIG. 1) such as, but not limited to, SMSC 204 (FIG. 2) and telephony service module 206 (FIG. 2) for receiving the one or more service requests. The cross-operator platform 302 then routes the received one or more service requests to the incoming message processor 304. In an embodiment of the present invention, the cross-operator platform 302 is also configured to facilitate extracting one or more attributes corresponding to the received one or more service requests.

In an embodiment of the present invention, the cross-operator platform 302 resides inside the cross-operator USSD module 300. In another embodiment of the present invention, the cross-operator platform 302 resides outside the cross-operator USSD module 300 and acts as an intermediary between the one or more communication devices 102 (FIG. 1) and the cross-operator USSD module 300.

In an embodiment of the present invention, the communication interface between the cross-operator platform 302 and the incoming message processor 304 is via Short Message Peer-to-Peer (SMPP) protocol to exchange SMS messages. In another embodiment of the present invention, the communication interface between the cross-operator platform 302 and the incoming message processor 304 is via Hypertext Transfer Protocol (HTTP).

The incoming message processor 304 is configured to receive the one or more service requests from the cross-operator platform 302. The incoming message processor 304 is further configured to process the received one or more service requests to extract and store the one or more attributes corresponding to the received one or more service requests. In an embodiment of the present invention, the extracted one or more attributes corresponding to the received one or more service requests include, but not limited to, Mobile Subscriber Integrated Services Digital Network (MSISDN) number, content of SMS message and any other unique number associated with the one or more communication devices.

In an embodiment of the present invention, the incoming message processor 304 extracts the MSISDN number of the one or more users calling the cross-operator number if the service request is in the form of a missed call. In another embodiment of the present invention, if a user sends SMS message to the cross-operator number then the incoming message processor 304, after ascertaining that the cross-operator number is associated with USSD service, extracts the MSISDN number corresponding to the communication device 102 (FIG. 1) used for sending the SMS message. The incoming message processor 304 then forwards the extracted MSISDN number along with the content of the SMS message to the menu manager 308.

Once the one or more attributes are extracted, the incoming message processor 304 forwards the extracted one or more attributes corresponding to each of the one or more received service requests to the menu manager 308. In an embodiment of the present invention, the incoming message processor 304 is configured to parse the content of the SMS message received via the cross-operator platform 302. In an embodiment of the present invention, the incoming message processor 304 facilitates maintaining communication protocols and ensures correct message routing to the menu manager 308. The incoming message processor 304 also acts as an intermediary and facilitates communication between the cross-operator platform 302 and the menu manager 308.

The BI module 306 is configured to retrieve information related to the one or more users based on at least one of: the one or more extracted attributes and the USSD service associated with the cross-operator number. In an embodiment of the present invention, the information related to the one or more users is provided by the TSPS/operators providing the telecommunication services to the one or more users.

In an embodiment of the present invention, the one or more extracted attributes facilitate the BI module 306 to identify the one or more users. Once the BI module 306 has identified the one or more users by using the one or more extracted attributes such as the MSISDN number, the BI module 306 provides a unified view of the profile of the one or more users based on previous transactions. The BI module 306 then analyses and determines preferences, interests, behaviour, usage and purchase pattern from the profile of the one or more users to retrieve appropriate information which is used by the menu manager 308 to generate a customized interactive USSD menu for the one or more users. The customized interactive USSD menu facilitates in providing relevant options to the one or more users. In an embodiment of the present invention, the BI module 306 uses one or more analytical techniques to retrieve and provide appropriate information related to the one or more users which facilitates the menu manager 308 to generate customized interactive USSD menu.

The menu manager 308 is configured to control and manage USSD menu creation and facilitate interactive USSD session with one or more communication devices 102 (FIG. 1). In an embodiment of the present invention, the menu manager 308 uses the information related to the one or more users retrieved by the BI module 306, the extracted one or more attributes and one or more pre-defined rules in the rules engine 310 to generate the customized interactive USSD menu. Further, the menu manager 308 generates the interactive USSD menu corresponding to the USSD service associated with the cross-operator number. In an embodiment of the present invention, the one or more pre-defined rules are criteria and conditions that facilitate the menu manager 308 to generate customized interactive USSD menus.

In an embodiment of the present invention, the menu manager 308 comprises a User Interface (UI) to facilitate one or more product managers to manage various static and dynamic USSD menus, enable configuring various parameters and dynamically link data so as to facilitate the menu manager 308 to generate customized USSD menus. In an embodiment of the present invention, the one or more product managers can also configure the parameters so as to customize the one or more pre-defined rules stored in the rules engine 310 that facilitate creating the interactive USSD menus.

In an embodiment of the present invention, the menu manager 308 is configured to customize and provide appropriate USSD menu based on the content of the SMS message received from the one or more users. In an embodiment of the present invention, the menu manager 308 is configured to provide a generic USSD menu in case the received SMS message is blank. In an embodiment of the present invention, the menu manager 308 is configured to provide a generic interactive USSD menu if the received service request is a missed call.

The rules engine 310 is configured to provide one or more pre-defined rules to facilitate the menu manager 308 to generate the one or more interactive USSD menus. In an embodiment of the present invention, the rules engine 310 provides the one or more pre-defined rules corresponding to the USSD service associated with the cross-operator number.

In an embodiment of the present invention, the USSD menu generated by the menu manager 308 comprises one or more options that can be selected by the one or more users to avail services via USSD. The one or more pre-defined rules include rules related to number of options, categories of options, duration, repetition and default options. In an exemplary embodiment of the present invention, a rule may correspond to the number of options that should be taken from user configured display choices versus dynamically configured display choices while generating the interactive USSD menu. In another exemplary embodiment of the present invention, a rule may correspond to number of times an option can be repeated. In yet another exemplary embodiment of the present invention, a rule may correspond to the duration for which certain options can be incorporated for a particular user in the USSD menu. In an embodiment of the present invention, each of the one or more pre-defined rules has corresponding prioritization and override guidelines that are used during USSD menu creation by the menu manager 308.

In an embodiment of the present invention, the one or more product managers can configure, add, delete and modify the one or more rules stored in the rules engine 310 based on current and future product promotions and new services being launched via the UI (not shown) provided by the menu manager 308.

The outgoing message processor 312 is configured to facilitate communication with the USSDC 208 (FIG. 2) to forward the generated interactive USSD menu to the one or more communication devices 102 (FIG. 1) using USSD thereby initiating the USSD session. In an embodiment of the present invention, the outgoing message processor 312 acts as intermediary between the menu manager 308 and USSDC 208 (FIG. 2). The outgoing message processor communicates with menu manager over various communication protocols such as, but not limited to, SMPP and HTTP. In an embodiment of the present invention, the outgoing message processor 312 facilitates protocol message creation and message routing.

Once the USSD session is initiated between the cross-operator USSD module and the one or more communication devices 102 (FIG. 1), the incoming message processor 304 and the outgoing message processor 312 facilitate message routing and performing customized and pre-defined workflows. Also, the incoming message processor 304 and the outgoing message processor 312 provide statistics corresponding to exchange of messages between the one or more communication devices 102 (FIG. 1) and cross-operator USSD module 300. Further, the incoming message processor 304 and the outgoing message processor 312 assist in interfacing with external billing modules (not shown) for billing the services selected by the one or more users via the USSD menu.

In an embodiment of the present invention, the incoming message processor 304 and the outgoing message processor 312 exist independently. In another embodiment of the present invention, the incoming message processor 304 and the outgoing message processor 312 exist as a single component which facilitates interfacing the menu manager 306 with the one or more communication devices 102 (FIG. 1) for both incoming and outgoing messages.

On receiving the interactive USSD menu on the communication device 102 (FIG. 1), the one or more users may select one or more options provided by the USSD menu. In an embodiment of the present invention, the cross-operator USSD module 300 comprises one or more additional components to facilitate initiating one or more additional actions based on the one or more options selected by the one or more users. The one or more additional actions include, but not limited to, voice calls via OutBound Dialer (OBD), automatic connection to Interactive Voice Response (IVR), E-mail, SMS messages, receiving voice calls and automatic connection to internet.

Figure 4A:
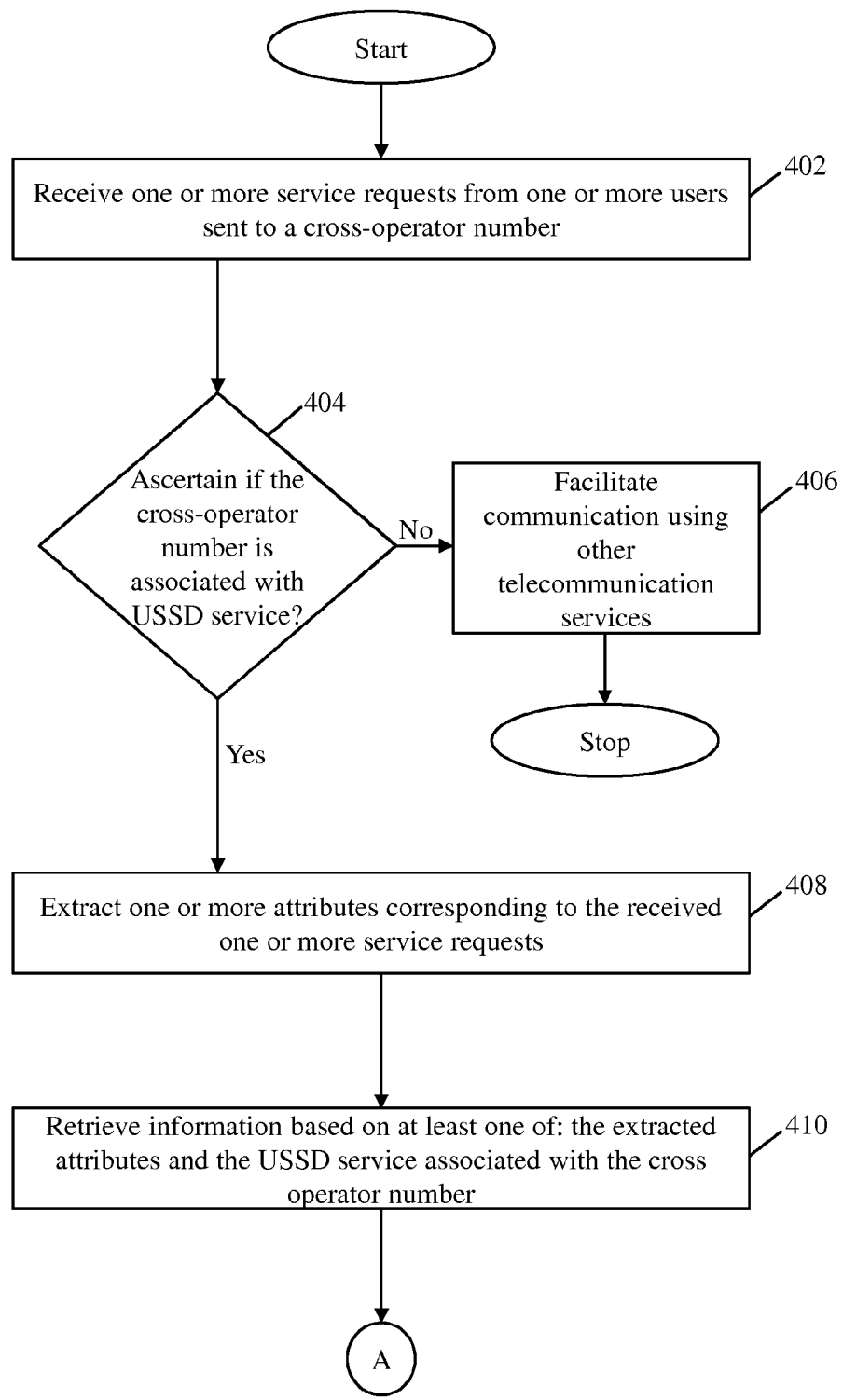
FIGS. 4A and 4B represent a flowchart illustrating a method for providing USSD services in accordance with an embodiment of the present invention.
Figure 4B:
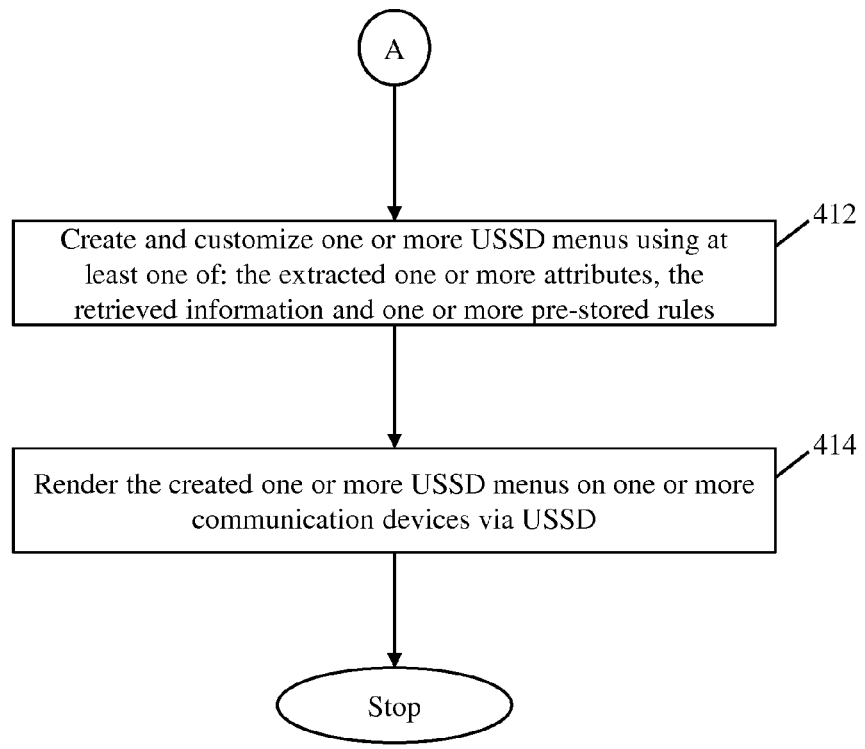

FIGS. 4A and 4B represent a flowchart illustrating a method for providing Unstructured Supplementary Service Data (USSD) services in accordance with an embodiment of the present invention.

At step 402, one or more service requests are received from one or more users sent to a cross-operator number. In an embodiment of the present invention, the one or more users send the one or more service requests via one or more communication devices associated with one or more Telecommunication Service Providers (TSPs). In an embodiment of the present invention, the one or more service requests include requests to avail telecommunication services such as, but not limited to, Short Message Service (SMS), Multimedia Messaging Service (MMS), General Packet Radio Service (GPRS), voice calls, missed calls and data calls.

In an embodiment of the present invention, the one or more users are customers availing the telecommunication services provided by the one or more TSPs. The one or more TSPs have telecommunication network (also referred as operator network) which comprises hardware and software elements to provide telecommunication services. In an embodiment of the present invention, the cross-operator number is used by the one or more users belonging to different TSPs/operators for sending the one or more service requests. Further, the cross-operator number is associated with services that can be availed via USSD. In an embodiment of the present invention, various services availed via USSD (also referred to as USSD services) include, but not limited to, Wireless Application Protocol (WAP) browsing, prepaid callback services, account balance/billing details service, mobile-money services, location-based content services, menu-based information services and configuring the one or more communication devices. In various embodiments of the present invention, the cross-operator number includes, but not limited to, a long code, a short code and a common short code. In an embodiment of the present invention, the cross-operator number is generated by a cross-operator USSD module and the one or more TSPs for availing the USSD services. In an embodiment of the present invention, the one or more communication devices include, but not limited to, a cell phone, a mobile phone, a Personal Digital Assistant (PDA), a smart phone, a device supporting Global System for Mobile (GSM) and any other telecommunication device.

At step 404, a check is performed to ascertain if the cross-operator number is associated with USSD service. In an embodiment of the present invention, the operator network comprises a Mobile Switching Center (MSC) server configured to ascertain if the cross-operator number is associated with the USSD services. If it is ascertained that the cross-operator number is not associated with the USSD service, then at step 406 the one or more service requests are processed and communication is facilitated using other telecommunication services such as, but not limited to, SMS, MMS, GPRS, voice calls and data calls. In an embodiment of the present invention, the MSC server routes the received one or more service requests to at least one of: a Short Message Service Center (SMSC) and a telephony service module if it is ascertained that the cross-operator number is not associated with the USSD services. In an embodiment of the present invention, the SMSC is configured to receive the one or more service requests from the MSC server and further interaction is performed via SMS messages. In another embodiment of the present invention, the telephony service module is configured to receive the one or more service requests from the MSC server and further interaction is performed via voice calls.

In an embodiment of the present invention, if a specific TSP/operator to which the one or more users belong is not providing the USSD service, then it is ascertained, by the MSC server, that the cross-operator number is not associated with the USSD service. The one or more service requests from the one or more users belonging to the specific TSP/operator are then processed and communication is facilitated using other telecommunication services such as, but not limited to, SMS, MMS, GPRS, voice calls and data calls.

If it is ascertained, by the MSC server, that the cross-operator number is associated with the USSD service, then at step 408, one or more attributes corresponding to the received one or more service requests are extracted by a cross-operator module. In an embodiment of the present invention, if it is ascertained that the cross-operator number is associated with the USSD services then the received one or more service requests are routed to the cross-operator USSD module. The one or more service requests are then processed for generating one or more interactive USSD menus based on one or more pre-defined rules and information retrieved from the one or more service requests such as the extracted one or more attributes. The one or more attributes corresponding to the one or more received service requests include, but not limited to, Mobile Subscriber Integrated Services Digital Network (MSISDN) number, content of SMS message and any other unique number associated with the one or more communication devices.

In an embodiment of the present invention, if the service request is a missed call then the MSISDN number corresponding to the communication device of the user calling on the cross-operator number is extracted. In another embodiment of the present invention, if the service request is SMS message, then the MSISDN number corresponding to the communication device used for sending the SMS message and the content of the SMS message is extracted.

At step 410, information based on at least one of: the extracted one or more attributes and the USSD service associated with the cross operator number is retrieved by the cross-operator USSD module. In an embodiment of the present invention, the one or more extracted attributes facilitate in identifying the one or more users. Once the one or more users are identified by using the one or more extracted attributes such as the MSISDN number, a unified view of the profile of the one or more users is provided. The user profiles are then analysed to determine user preferences, interests, behaviour, usage and purchase pattern. After analysing the user profiles, appropriate information for creating one or more interactive USSD menus is retrieved. The retrieved information is then used by the cross-operator USSD module to generate and customize the one or more interactive USSD menus for the one or more users. The one or more customized interactive USSD menus facilitate in providing relevant options to the one or more users. In an embodiment of the present invention, one or more analytical techniques are used to retrieve and provide appropriate information for creating an appropriate USSD menu.

At step 412, the one or more interactive USSD menus are generated using at least one of: the one or more extracted attributes, the retrieved information and the one or more pre-defined rules by the cross-operator USSD module. In an embodiment of the present invention, the one or more pre-defined rules are criteria and conditions that facilitate creating and customizing the one or more USSD menus. The one or more pre-defined rules include rules related to number of options, categories of options, duration, repetition and default options. In an embodiment of the present invention, one or more product managers can customize and manage various static and dynamic USSD menus, enable configuring various parameters and dynamically link data so as to facilitate creating and customizing the one or more interactive USSD menus. In an embodiment of the present invention, the one or more product managers can also set/configure the parameters so as to customize the one or more pre-defined rules.

In an embodiment of the present invention, a customized USSD menu is generated based on the content of the SMS message received from the one or more users. In an embodiment of the present invention, a generic interactive USSD menu is generated if the received SMS message is blank. In another embodiment of the present invention, a generic interactive USSD menu is generated if the received service request is in the form of a missed call.

At step 414, the generated one or more interactive USSD menus are rendered on the one or more communication devices via USSD. In an embodiment of the present invention, the generated one or more interactive USSD menus are forwarded to a USSDC which are then rendered on the one or more communication devices using USSD.

Once the USSD session is initiated, the one or more users may select one or more options provided by the one or more interactive USSD menus for availing the USSD services. In an embodiment of the present invention, based on the one or more options selected by the one or more users, one or more additional actions may be initiated. The one or more additional actions include, but not limited to, a call via OutBound Dialer (OBD), automatic connection to Interactive Voice Response (IVR), an E-mail, an SMS message, a voice call and connection to internet.

Figure 5A:
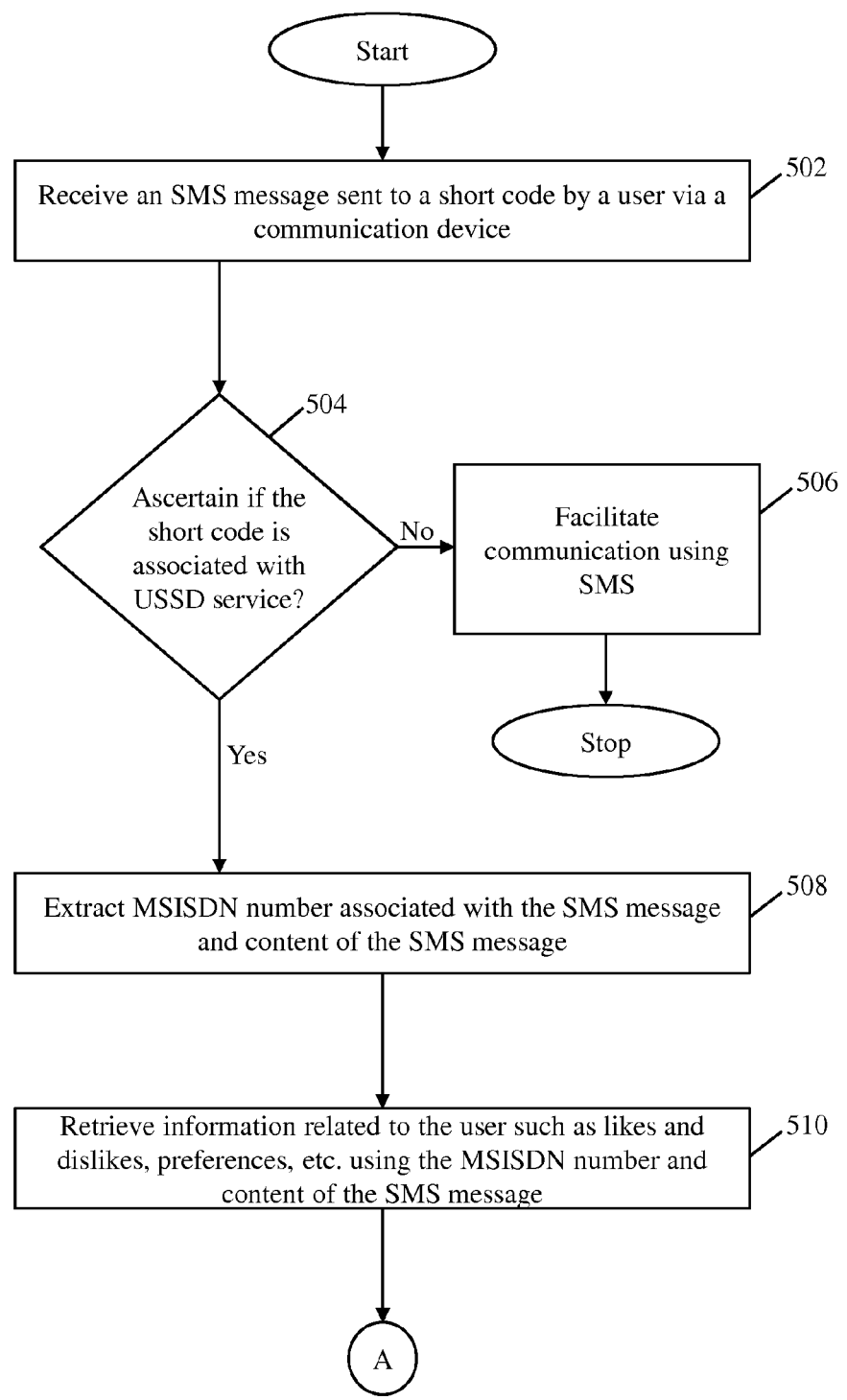
FIGS. 5A and 5B represent a flowchart illustrating a method for providing USSD services by sending SMS on a short code in accordance with an exemplary embodiment of the present invention.
Figure 5B:
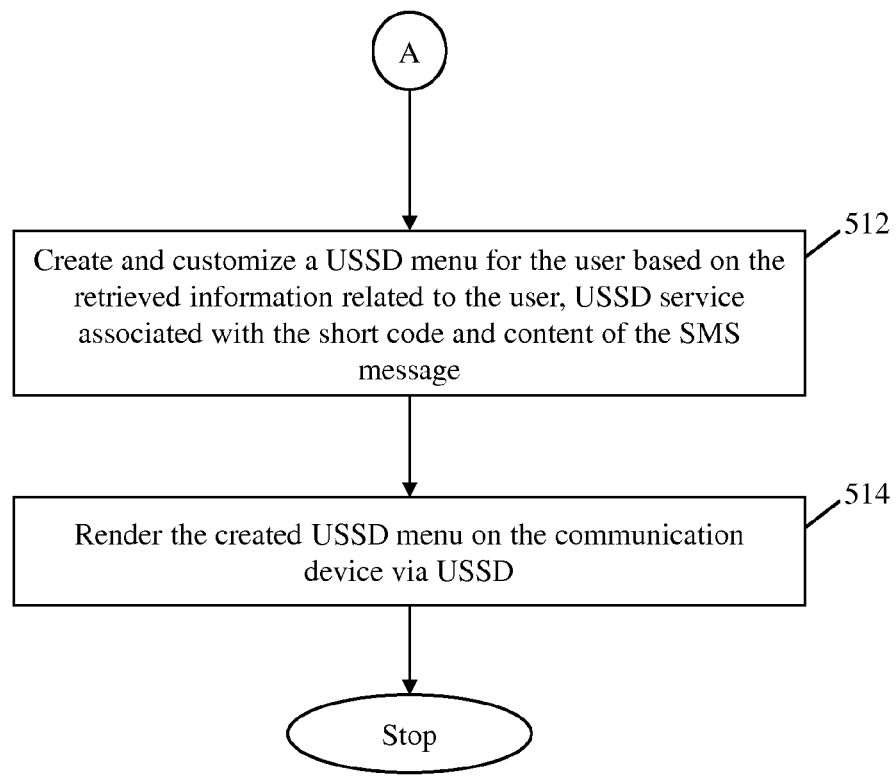

FIGS. 5A and 5B represent a flowchart illustrating a method for providing USSD services by sending SMS on a short code in accordance with an exemplary embodiment of the present invention.

At step 502, SMS message sent to a short code by a user via a communication device is received. In an embodiment of the present invention, content of the SMS message may include keywords, alphabets, numerals, characters and codes such as, but not limited to, "RBT", "ringtones", "hello tunes", *123*11# and "*121#" associated with the various USSD services. In another embodiment of the present invention, the SMS message may be blank.

At step 504, a check is performed to ascertain if the short code is associated with the USSD service. If it is ascertained that the short code is not associated with the USSD service, then at step 506, communication using SMS is facilitated. In an embodiment of the present invention, if the TSP/operator providing telecommunication services is not associated with the USSD service then typical SMS communication is facilitated on the user's communication device. In an embodiment of the present invention, if it is ascertained that the short code is associated with the USSD service, then at step 508, MSISDN number associated with the SMS message and content of the SMS message is extracted.

At step 510, information related to the user is retrieved using the MSISDN number and content of the message. In an embodiment of the present invention, the user is identified using the MSISDN number. Once the user is identified, relevant information related to the user including, but not limited to, user preferences, user's likes and dislikes are extracted using the MSISDN number and content of the message. Further, the retrieved information related to the user is provided by the TSP/operator providing telecommunication services to the user.

At step 512, an interactive USSD menu is generated and customized for the user using at least one of: the retrieved information related to the user, USSD service associated with the short code and content of the SMS message. Further, the USSD menu may also be customized to greet the user using the user's name and then providing a list of relevant RBT related options.

At step 514, the generated and customized interactive USSD menu is rendered on the user's communication device.

In an exemplary embodiment of the present invention, a user sends a message "RBT" to a short code "5XXXX". The short code such as "5XXXX" may be associated with a RingBack Tones (RBTs) service and may facilitate providing an interactive USSD menu to set RBTs on the user's communication device. Once the SMS message is received, the MSISDN number associated with the SMS message and the content "RBT" of the SMS message is extracted. Based on the MSISDN number, the user is identified and information related to the user such as, but not limited to, user's preferred genre such as jazz and rock, user's disliked genre such as classical and user's previous RBT selections is retrieved. A customized interactive USSD menu is then generated using the retrieved information. Further, the generated and customized interactive USSD menu is then rendered on the user's communication device. In an embodiment of the present invention, the customized USSD menu in response to the message "RBT" sent to the short code "5XXXX" is as shown below:

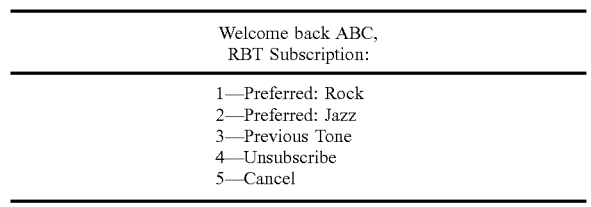

Welcome back ABC,
RBT Subscription:

1—Preferred: Rock
2—Preferred: Jazz
3—Previous Tone
4—Unsubscribe
5—Cancel

Figure 6A:
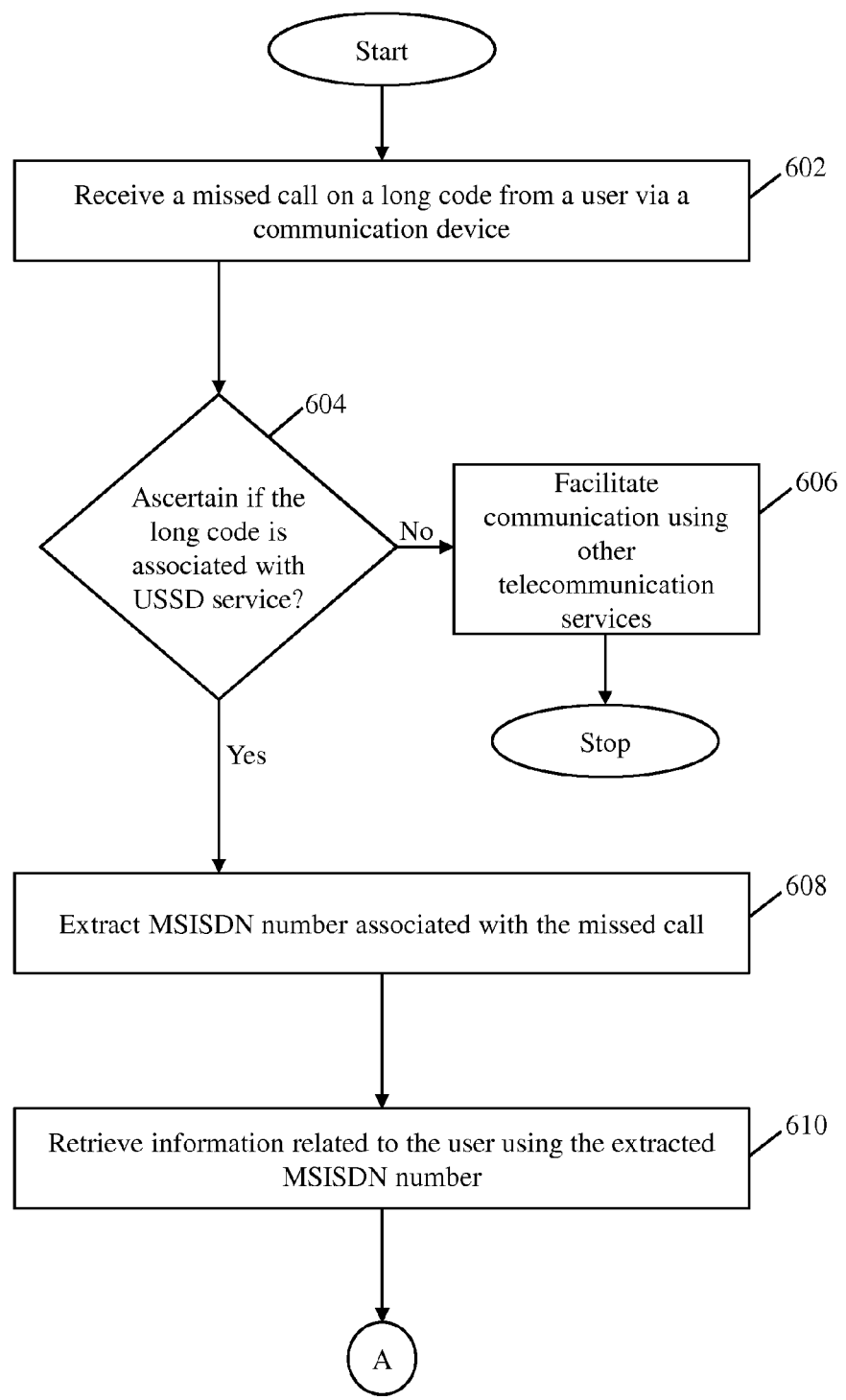
FIGS. 6A and 6B represent a flowchart illustrating a method for providing USSD services by placing a missed call on a long code in accordance with an exemplary embodiment of the present invention.
Figure 6B:
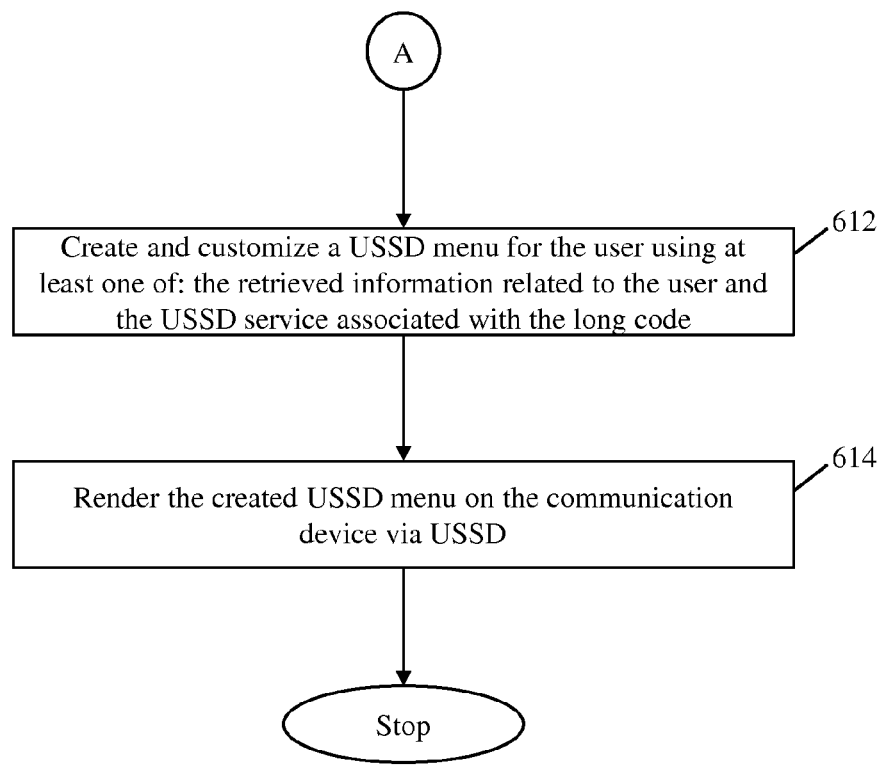

FIGS. 6A and 6B represent a flowchart illustrating a method for providing USSD services by placing a missed call on a long code in accordance with an exemplary embodiment of the present invention.

At step 602, a missed call is received on a long code from a user via a communication device. In an embodiment of the present invention, the user may place a missed call on a long code such as, but not limited to, "9XXXXXXXX", "1-800-XXX", toll-free numbers and any other long code numbers.

At step 604, a check is performed to ascertain if the long code is associated with USSD service. In an embodiment of the present invention, if it is ascertained that the long code is not associated with the USSD service then at step 606, communication using other telecommunication services is facilitated.

In an embodiment of the present invention, if it is ascertained that the long code is associated with the USSD service then at step 608, MSISDN number associated with the missed call is extracted.

At step 610, information related to the user is retrieved using the extracted MSISDN number. In an embodiment of the present invention, the user is identified using the MSISDN number. Once the user is identified, information related to the user is retrieved. In an embodiment of the present invention, the TSP/operator providing telecommunication services to the user provides information related to the user.

At step 612, an interactive USSD menu is generated and customized using at least one of: the retrieved information and the USSD service associated with the long code.

At step 614, the generated and customized interactive USSD menu is rendered on the user's communication device.

In an exemplary embodiment of the present invention, the user may place a missed call on a long code such as, but not limited to, "9XXXXXXXX". Further, the long code "9XXXXXXXX" is associated with missed call alert service and facilitates in providing interactive USSD menus to subscribe or unsubscribe for missed call alerts. Once the missed call is placed, MSIDSDN number associated with the missed call is extracted. Based on the extracted MSISDN number, the user is identified and information related to the user such as, but not limited to, status of missed call alert service subscription and connection details such as prepaid or postpaid connection is retrieved. The retrieved information is then used to generate and customize an interactive USSD menu. In an embodiment of the present invention, the customized USSD menu in response to the missed call received on the long code "9XXXXXXXX" is as shown below:

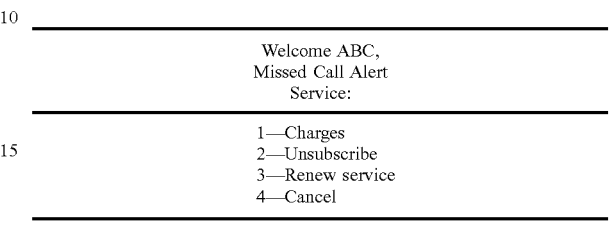

Welcome ABC,
Missed Call Alert
Service:

1—Charges
2—Unsubscribe
3—Renew service
4—Cancel

Figure 7A:
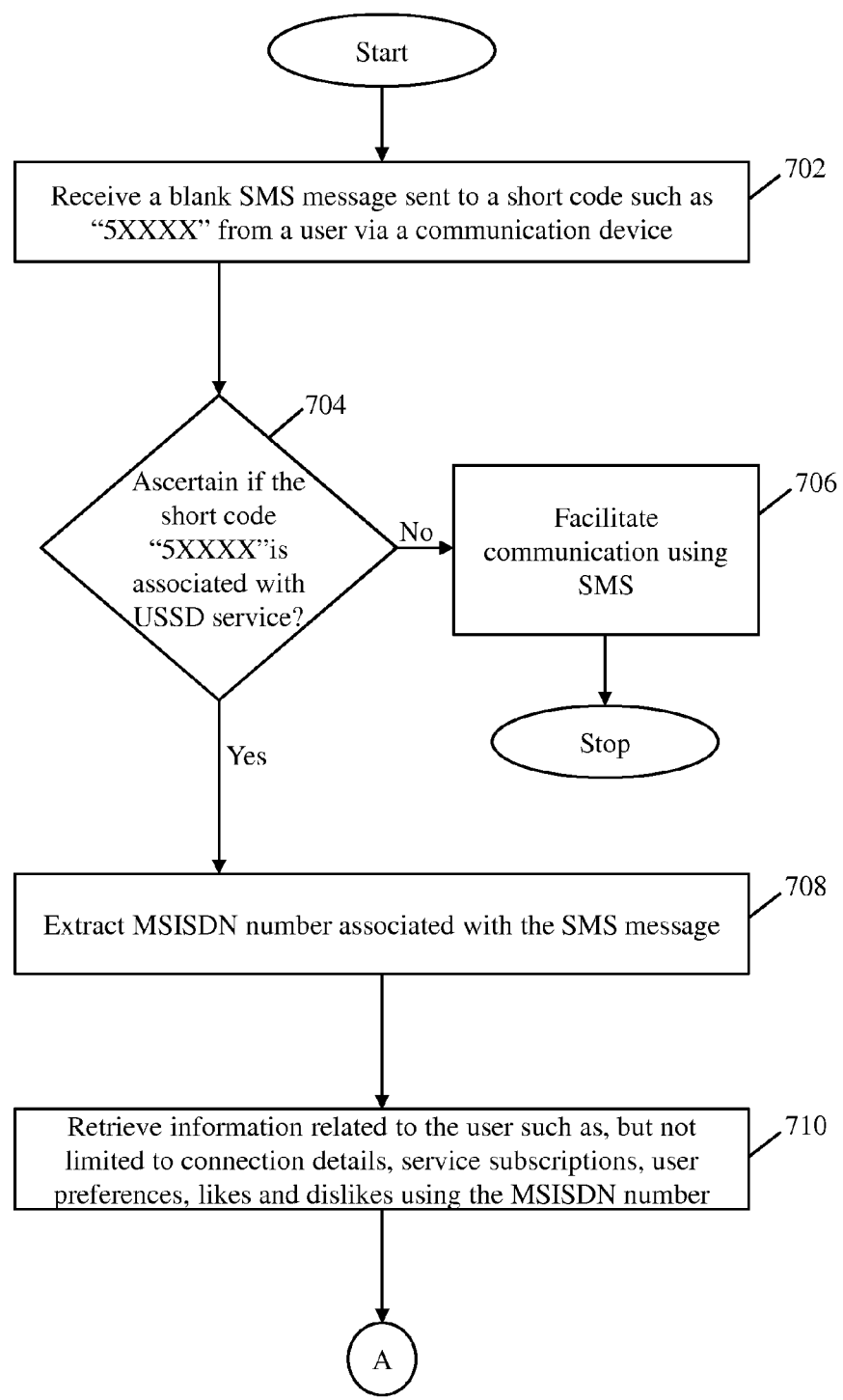
FIGS. 7A and 7B represent a flowchart illustrating a method for providing USSD services by sending a blank SMS message on a short code in accordance with an exemplary embodiment of the present invention.
Figure 7B:
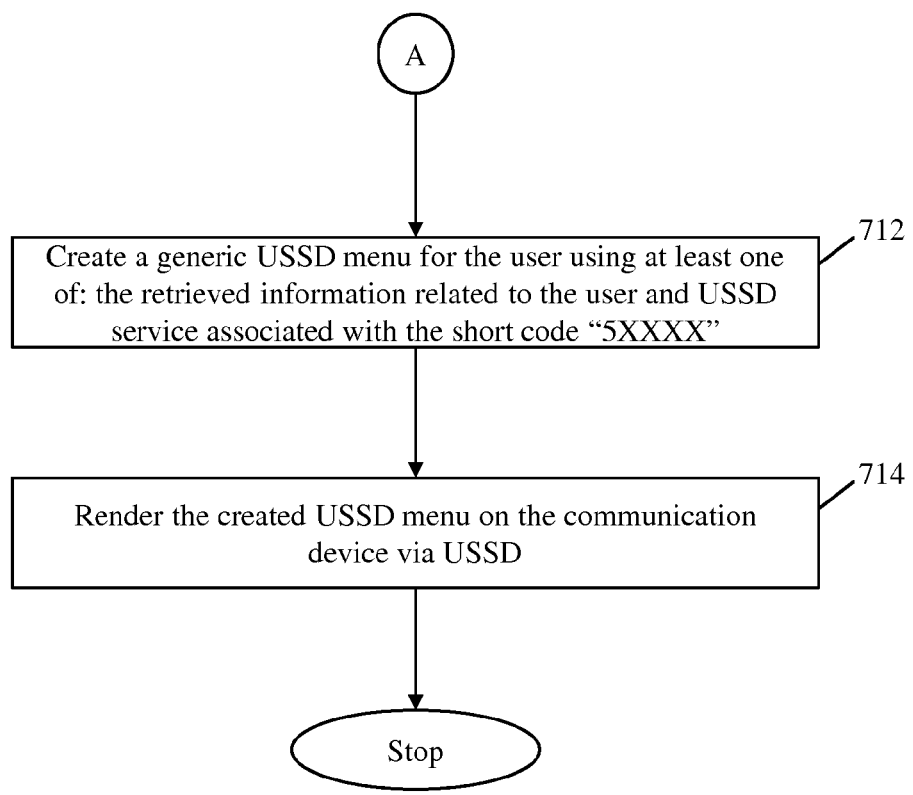

FIGS. 7A and 7B represent a flowchart illustrating a method for providing USSD services by sending a blank SMS message on a short code in accordance with an exemplary embodiment of the present invention.

At step 702, a blank SMS message sent to a short code such as "5XXXX" by a user via a communication device is received. Further, the short code "5XXXX" is associated with account balance/billing details service which is typically availed by using one or more USSD codes such as, but not limited to, *123#, *141# and *123*11# provided by various TSPS/operators.

At step 704, a check is performed to ascertain if the short code "5XXXX" is associated with USSD service. In an embodiment of the present invention, if the short code "5XXXX" is not associated with the USSD service then at step 706, communication is facilitated using SMS. In another embodiment of the present invention, if the TSP/operator associated with the user has not provisioned the USSD service for the short code "5XXXX" then also communication is facilitated using SMS.

In an embodiment of the present invention, if it is ascertained the short code "5XXXX" is associated with the USSD service then at step 708, MSISDN number associated with the blank SMS message is extracted. In another embodiment of the present invention, if the TSP/operator associated with the user has provisioned the USSD service for the short code "5XXXX" then also MSISDN number associated with the blank SMS message is extracted.

At step 710, information related to the user such as, but not limited to, connection details, service subscriptions, usage, purchase pattern, behavior, preferences, likes and dislikes are retrieved using the extracted MSISDN number associated with the blank SMS message. In an exemplary embodiment of the present invention, connection details refer to user's connection type such as postpaid connection and prepaid connection. The service subscriptions refer to the services subscribed by the user such as RBTs service, astrology service, news service, weather alerts service, mobile radio service, other VAS and any other services. Usage, purchase pattern and behavior include information such as, but not limited, frequency of changing RBT, genre of RBT, account balance in case of prepaid connection, overdue bill if any incase of postpaid connection and frequency of subscribing to various VAS.

At step 712, a generic USSD menu is generated using at least one of: the retrieved information related to the user and the account balance/billing details service associated with the short code "5XXXX".

At step 714, the generated generic USSD menu is rendered on the user's communication device via USSD. In an exemplary embodiment of the present invention, the generic menu rendered on the user's communication device is as shown below:

| Welcome ABC, |
| --- |
| Main Menu: |
| 1—Special Offer |
| 2—Unbilled |
| 3—Due Amount |
| 4—Start a service |
| 5—Stop a service |
| 0—More Options |

Figure 8:
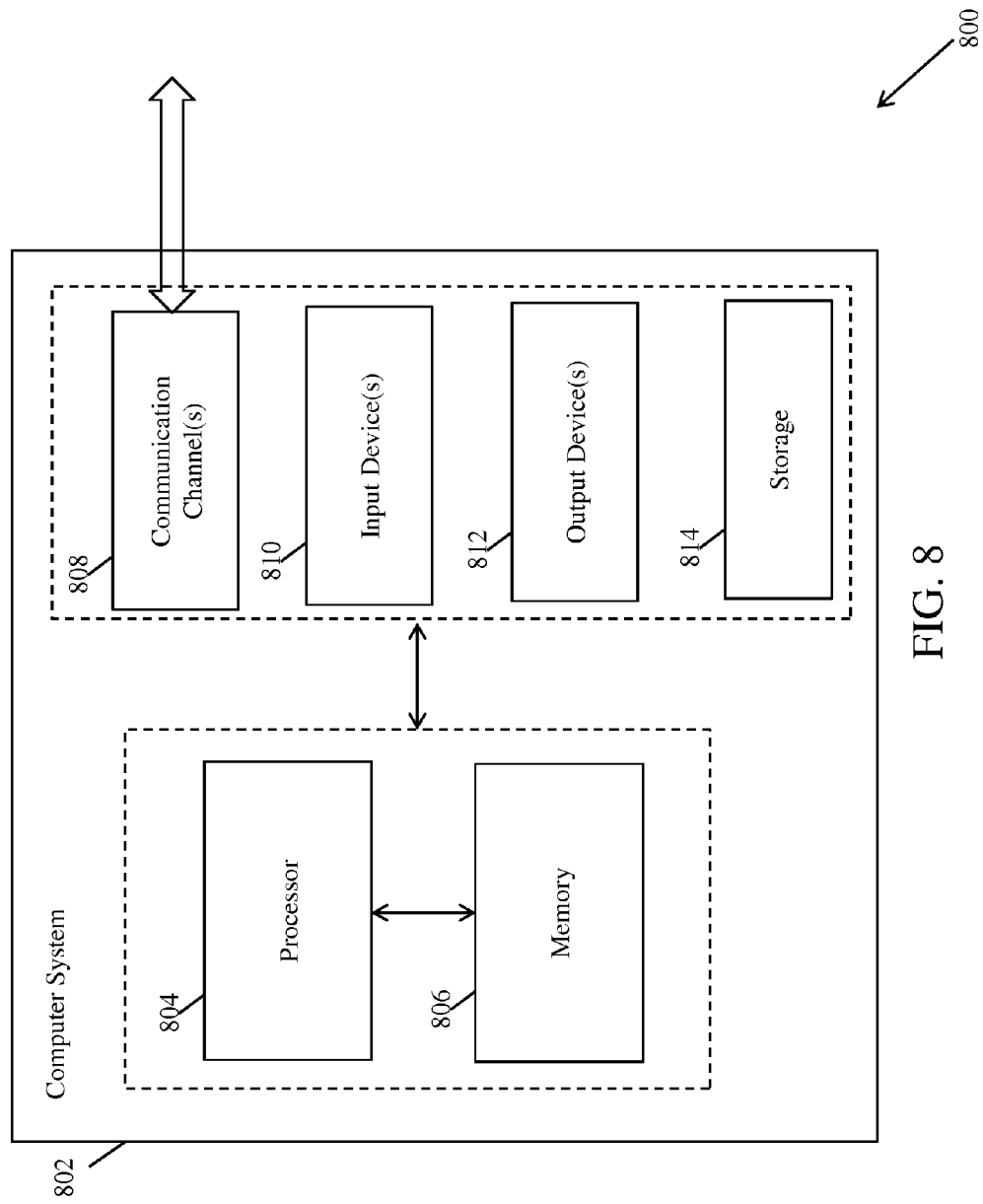
FIG. 8 illustrates an exemplary computer system in which various embodiments of the present invention may be implemented.

FIG. 8 illustrates an exemplary computer system for automated coding and testing of insurance benefits in accordance with an embodiment of the present invention.

The computer system 802 comprises a processor 804 and a memory 806. The processor 804 executes program instructions and may be a real processor. The processor 804 may also be a virtual processor. The computer system 802 is not intended to suggest any limitation as to scope of use or functionality of described embodiments. For example, the computer system 802 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 806 may store software for implementing various embodiments of the present invention. The computer system 802 may have additional components. For example, the computer system 802 includes one or more communication channels 808, one or more input devices 810, one or more output devices 812, and storage 814. An interconnection mechanism (not shown) such as a bus, controller, or network, interconnects the components of the computer system 802. In various embodiments of the present invention, operating system software (not shown) provides an operating environment for various softwares executing in the computer system 802, and manages different functionalities of the components of the computer system 802.

The communication channel(s) 808 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, bluetooth or other transmission media.

The input device(s) 810 may include, but not limited to, a keyboard, mouse, pen, joystick, trackball, a voice device, a scanning device, or any another device that is capable of providing input to the computer system 802. In an embodiment of the present invention, the input device(s) 810 may be a sound card or similar device that accepts audio input in analog or digital form. The output device(s) 812 may include, but not limited to, a user interface on CRT or LCD, printer, speaker, CD/DVD writer, or any other device that provides output from the computer system 802.

The storage 814 may include, but not limited to, magnetic disks, magnetic tapes, CD-ROMs, CD-RWs, DVDs, flash drives or any other medium which can be used to store information and can be accessed by the computer system 802. In various embodiments of the present invention, the storage 814 contains program instructions for implementing the described embodiments.

The present invention may suitably be embodied as a computer program product for use with the computer system 802. The method described herein is typically implemented as a computer program product, comprising a set of program instructions which is executed by the computer system 802 or any other similar device. The set of program instructions may be a series of computer readable codes stored on a tangible medium, such as a computer readable storage medium (storage 814), for example, diskette, CD-ROM, ROM, flash drives or hard disk, or transmittable to the computer system 802, via a modem or other interface device, over either a tangible medium, including but not limited to optical or analogue communications channel(s) 808. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

I claim:

1. A computer-implemented method for providing Unstructured Supplementary Service Data (USSD) services using program instructions stored in a memory and executed by a microprocessor, the method comprising the steps of:
    configuring a cross-operator USSD module for:
        receiving, using the microprocessor, one or more service requests sent to a cross-operator number by one or more communication devices associated with one or more telecommunication service providers, wherein the one or more service requests are received in form of Short Message Service (SMS) messages, the SMS messages being one of: SMS with content and blank SMS;
        processing, using the microprocessor, the one or more service requests for generating a first interactive USSD menu and a second interactive USSD menu based on information retrieved from the one or more service requests and one or more pre-defined rules, wherein the first interactive USSD menu is generated for the SMS received with the content and is further based on content of the received SMS, the second interactive USSD menu is generated for the received blank SMS; and
        rendering, using the microprocessor, the first interactive USSD menu and the second interactive USSD menu on the one or more communication devices, the first interactive USSD menu and the second interactive USSD menu facilitate one or more users of the one or more communication devices to avail the USSD services, wherein first interactive USSD menu is different from the second interactive USSD menu.

2. The computer-implemented method of claim 1, wherein configuring the cross-operator USSD module further comprises the steps of:
extracting, using the microprocessor, one or more attributes corresponding to the received one or more service requests;
retrieving, using the microprocessor, information related to the one or more users based on at least one of: the one or more extracted attributes and the USSD services associated with the cross-operator number; and
generating and customizing, using the microprocessor, the first USSD menu and the second USSD menu using at least one of: the one or more extracted attributes, the retrieved information and the one or more pre-defined rules.

3. The computer-implemented method of claim 2, wherein the one or more attributes corresponding to the received one or more service requests comprise at least one of: Mobile Subscriber Integrated Services Digital Network (MSISDN) number, and any other unique number associated with the one or more communication devices.

4. The computer-implemented method of claim 2, wherein retrieving the information related to the one or more users comprises:
identifying, using the microprocessor, profiles of the one or more users using the one or more extracted attributes;
analyzing, using the microprocessor, the profiles for determining and retrieving information comprising at least one of: preferences, interests, behaviors, usage and purchase patterns of the one or more users; and
generating, using the microprocessor, the first and second customized interactive USSD menus using the retrieved information.

5. The computer-implemented method of claim 1, wherein the cross-operator number is generated, using the microprocessor, by the cross-operator module and the one or more telecommunication service providers for availing the USSD services.

6. The computer-implemented method of claim 1, further comprising configuring a Mobile Switching Center (MSC) server for:
receiving the one or more service requests sent from the one or more communication devices to the cross-operator number;
ascertaining if the cross-operator number is associated with the USSD services;
routing the received one or more service requests to the cross-operator USSD module if it is ascertained that the cross-operator number is associated with the USSD services; and
routing the received one or more service requests to a Short Message Service Center (SMSC) if it is ascertained that the cross-operator number is not associated with the USSD services.

7. The computer-implemented method of claim 6, wherein the SMSC is configured to receive the one or more service requests from the MSC server and further interaction is performed via SMS.

8. The computer-implemented method of claim 1, wherein the cross-operator number includes and is not limited to a long-code, a short-code, and a common short-code.

9. The computer-implemented method of claim 1, wherein the one or more service requests are telecommunication service requests further comprising at least one of: sending a Multimedia Messaging Service (MMS), initiating a General Packet Radio Service (GPRS) connection, a missed call and placing a data call.

10. The computer-implemented method of claim 1, wherein the USSD service associated with the cross-operator number comprise at least one of: Wireless Application Protocol (WAP) browsing service, prepaid callback service, account balance/billing details service, mobile-money service, location-based content service, menu-based information service, value-added service and device configuration service.

11. The computer-implemented method of claim 1, wherein the one or more pre-defined rules comprise at least one of: rules related to number of options, categories of options, repetition of options, validity of options and default options to be provided in a USSD menu.

12. A computer system for providing Unstructured Supplementary Service Data (USSD) services, the computer system comprising a memory and a microprocessor, the computer system further comprising:
one or more communication devices associated with one or more telecommunication service providers for sending one or more service requests to a cross-operator number; and
a cross-operator USSD module configured to:
receive, using the microprocessor, the one or more service requests wherein the one or more service requests are received in form of at least one of: a Short Message Service (SMS) messages, the SMS messages being one of: SMS with content and blank SMS;
process, using the microprocessor, the one or more service requests for generating based on information retrieved from the one or more service requests and one or more pre-defined rules, wherein the first interactive USSD menu is generated for the SMS received with the content and is further based on content of the received SMS, the second interactive USSD menu is generated for the received blank SMS; and
render, using the microprocessor, the first interactive USSD menu and the second interactive USSD menu on the one or more communication devices, wherein the first interactive USSD menu and the second interactive USSD menu facilitate one or more users to avail the USSD services, wherein first interactive USSD menu is different from the second interactive USSD menu.

13. The computer system of claim 12, wherein the cross-operator USSD module is configured to communicate with one or more operator networks for providing USSD services to the one or more users.

14. The computer system of claim 12, wherein the cross-operator USSD module comprises:
an incoming message processor configured to extract, using the microprocessor, one or more attributes corresponding to the received one or more service requests;
a business intelligence module configured to retrieve, using the microprocessor, information related to the one or more users using the one or more communication devices based on at least one of: the one or more extracted attributes and the USSD services associated with the cross-operator number; and a rules engine configured to provide, using the microprocessor, the one or more pre-defined rules; and a menu manager configured to customize, using the microprocessor, the generated first USSD menu and the second generated USSD menus using at least one of: the one or more extracted attributes, the retrieved information and one or more pre-defined rules.

15. The computer system of claim 14, wherein retrieving the information related to the one or more users using the one or more communication devices comprises:

identifying, using the microprocessor, profiles of the one or more users using the one or more extracted attributes;

analyzing, using the microprocessor, the profiles for determining and retrieving information comprising at least one of: preferences, interests, behaviors, usage and purchase patterns of the one or more users; and forwarding, using the microprocessor, the retrieved information to the menu manager for generating the first and second customized interactive USSD menus.

16. The computer system of claim 14, wherein the one or more attributes corresponding to the received one or more service requests comprise at least one of: Mobile Subscriber Integrated Services Digital Network (MSISDN) number, and any other unique number associated with the one or more communication devices.

17. The computer system of claim 12, further comprising a Mobile Switching Center (MSC) server configured to:

receive the one or more service requests sent from the one or more communication devices to the cross-operator number;

ascertain if the cross-operator number is associated with the USSD services;

route the received one or more service requests to the cross-operator USSD module if it is ascertained that the cross-operator number is associated with the USSD services; and route the received one or more service requests to a Short Message Service Center (SMSC) if it is ascertained that the cross-operator number is not associated with the USSD services.

18. The computer system of claim 17, wherein the SMSC is configured to receive the one or more service requests from the MSC server and further interaction is performed via SMS.

19. The computer system of claim 12, wherein the cross-operator number includes and is not limited to a long-code, a short-code, and a common short-code.

20. The computer system of claim 12, wherein the one or more service requests are telecommunication service requests further comprising at least one of: sending a Multimedia Messaging Service (MMS), initiating a General Packet Radio Service (GPRS) connection, a missed call and placing a data call.

21. The computer system of claim 12, wherein the USSD service associated with the cross-operator number comprise at least one of: Wireless Application Protocol (WAP) browsing service, prepaid callback service, account balance/billing details service, mobile-money service, location-based content service, menu-based information service, value-added service and device configuration service.

22. The computer system of claim 12, wherein the one or more pre-defined rules comprise at least one of: rules related to number of options, categories of options, repetition of options, validity of options and default options to be provided in a USSD menu.

23. A computer program product for providing Unstructured Supplementary Service Data (USSD) services, the computer program product comprising:

a non-transitory computer-readable medium having computer-readable program code stored thereon, the computer-readable program code comprising instructions that when executed by a processor, cause the processor to:

receive one or more service requests sent to a cross-operator number by one or more communication devices associated with one or more telecommunication service providers wherein the one or more service requests are received in form of Short Message Service (SMS) messages, the SMS messages being one of: SMS with content and blank SMS;

process the one or more service requests for generating a first interactive USSD menu and a second interactive USSD menu based on information retrieved from the one or more service requests and one or more pre-defined rules, wherein the first interactive USSD menu is generated for the SMS received with the content and is further based on content of the received SMS, the second interactive USSD menu is generated for the received blank SMS; and render the first interactive USSD menu and the second interactive USSD menu on the one or more communication devices, the first interactive USSD menu and the second interactive USSD menu facilitate one or more users of the one or more communication devices to avail the USSD services, wherein first interactive USSD menu is different from the second interactive USSD menu.

24. The computer program product of claim 23 further comprising:

extracting one or more attributes corresponding to the received one or more service requests;

retrieving information related to the one or more users based on at least one of: the one or more extracted attributes and the USSD services associated with the cross-operator number; and generating and customizing the first USSD menu and the second USSD menu using at least one of: the one or more extracted attributes, the retrieved information and the one or more pre-defined rules.

25. The computer program product of claim 24, wherein retrieving the information related to the one or more users comprises:

identifying profiles of the one or more users using the one or more extracted attributes; analyzing the profiles for determining and retrieving information comprising at least one of: preferences, interests, behaviors, usage and purchase patterns of the one or more users; and generating the first and second customized interactive USSD menus using the retrieved information.

* * * * *